Feb. 4, 1964  A. J. BUTTERWORTH  3,120,398
DEVICE FOR MOVING SEMI-TRAILERS SIDEWISE
Filed Dec. 3, 1959  3 Sheets-Sheet 1
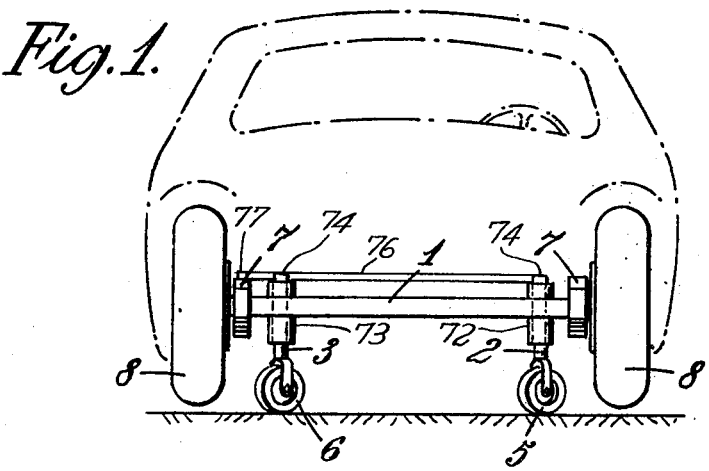
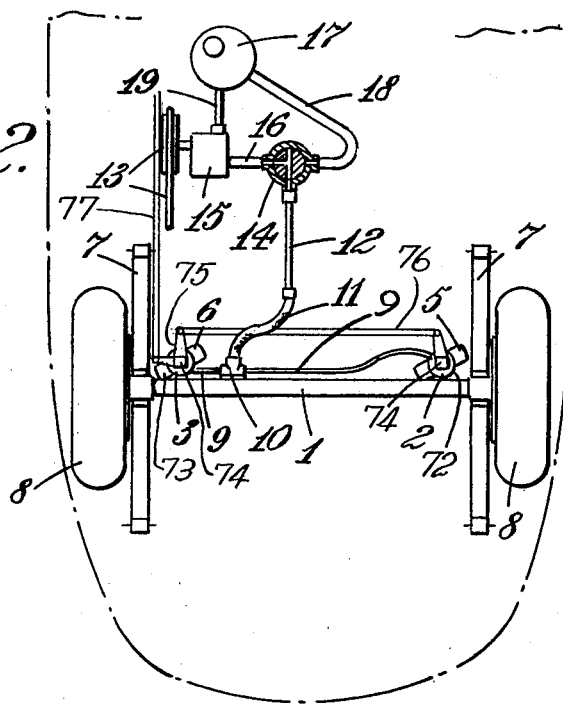
INVENTOR
ARCHIBALD JAMES BUTTERWORTH
By Irwin S. Thompson
ATTY.

Feb. 4, 1964  A. J. BUTTERWORTH  3,120,398
DEVICE FOR MOVING SEMI-TRAILERS SIDEWISE
Filed Dec. 3, 1959  3 Sheets-Sheet 2
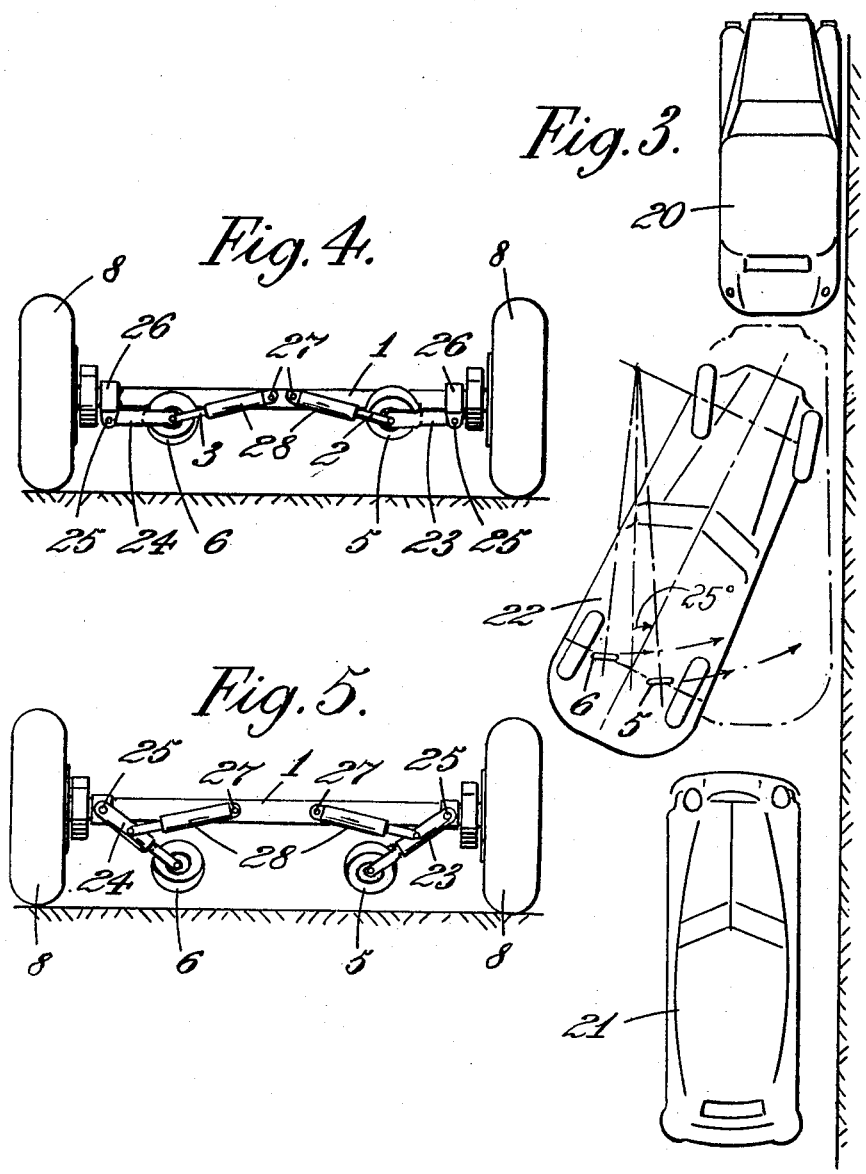
INVENTOR
ARCHIBALD JAMES BUTTERWORTH
By Irwin S. Thompson
ATTY.

Feb. 4, 1964   A. J. BUTTERWORTH   3,120,398
DEVICE FOR MOVING SEMI-TRAILERS SIDEWISE
Filed Dec. 3, 1959   3 Sheets-Sheet 3
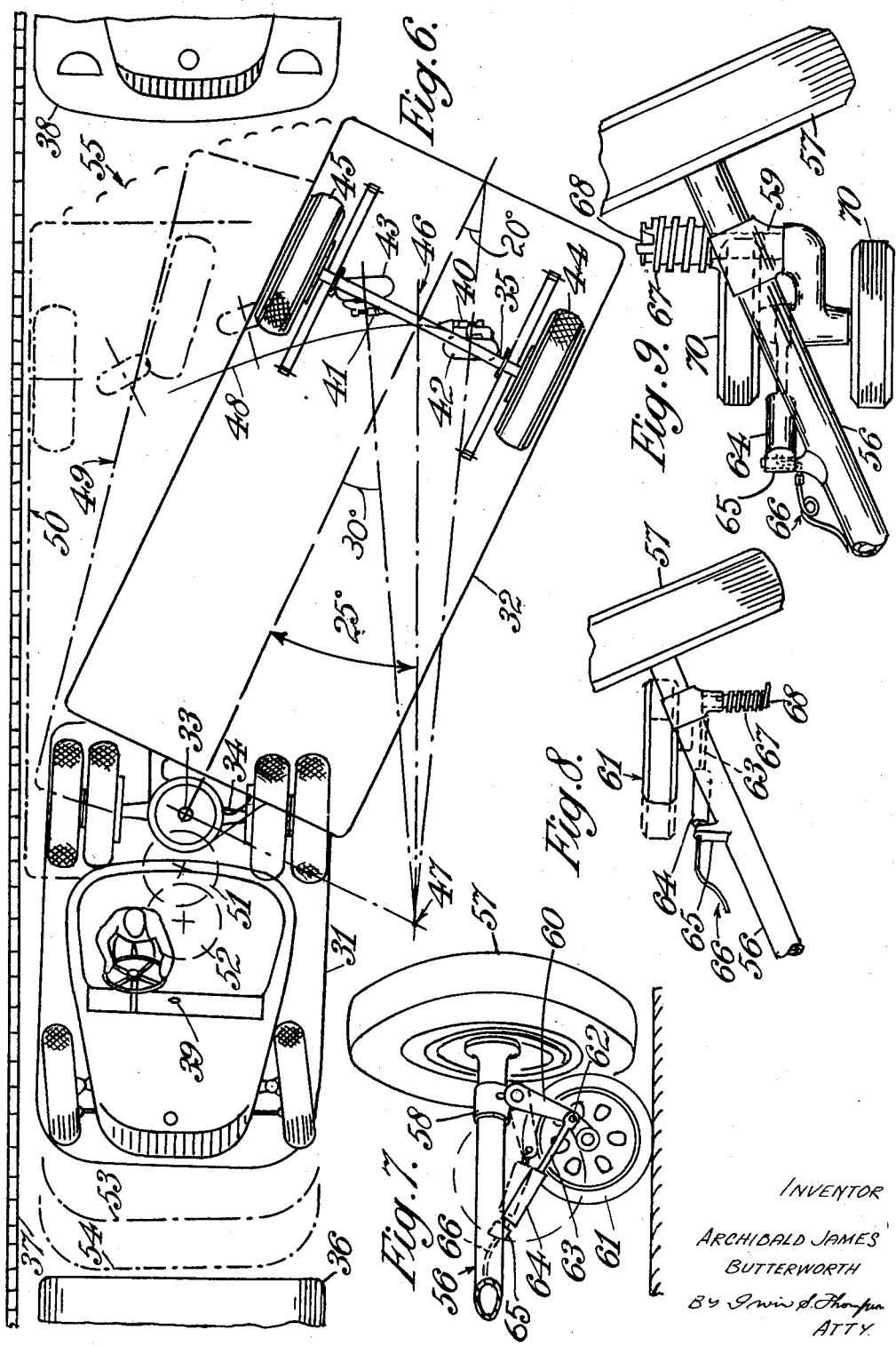
INVENTOR
ARCHIBALD JAMES
BUTTERWORTH
By Irwin S. Thompson
ATTY.

United States Patent Office 3,120,398
Patented Feb. 4, 1964

3,120,398
DEVICE FOR MOVING SEMI-TRAILERS SIDEWISE
Archibald James Butterworth, Frimley, near Aldershot, England, assignor to Sidler Limited, London, England, a company of Great Britain
Filed Dec. 3, 1959, Ser. No. 857,138
2 Claims. (Cl. 280—423)

This invention relates to car parking apparatus particularly for enabling a car to be manoeuvred into and out of a comparatively small gap left between two cars parked by the side of the road. The term car is intended to include articulated vehicles such as trailer and semi-trailer combinations. An object of the invention is to provide an apparatus which will enable one end of the car to be driven slantwise into the gap whereupon the apparatus is brought into operation which results in further movement of said end of the car into the gap causing the other end of the car to be slewed comparatively rapidly towards the side of the road so as to bring the car parallel to said side.

A further object of the invention is to arrange two road-engaging rollers adjacent those wheels of the vehicle which are neither driven nor steered, which rollers rotate about axes which, as viewed in plan, are inclined to the fore and aft axes of the vehicle whereby manipulating of the steering gear for the steerable wheels at the other end of the vehicle enables translatory movement of the vehicle to impart lateral movement directly to both ends of the vehicle.

The accompanying diagrammatic drawing shows the invention applied to a front wheel drive car and in which:

FIGURE 1 is a rear elevation of the car;
FIGURE 2 is a plan view of the rear part of the car with the body removed;
FIGURE 3 is a plan view showing the method of parking;
FIGURE 4 is a similar view to FIGURE 1 showing an alternative method of mounting the roller;
FIGURE 5 is also a similar view to FIGURE 1 showing another alternative method of mounting the roller.
FIGURE 6 is a similar view as FIGURE 3 showing the invention applied to an articulated vehicle;
FIGURE 7 is a rear elevation looking along the axis of rotation of one of the rollers;
FIGURE 8 is a plan of the arrangement shown in FIGURE 7 and
FIGURE 9 is a similar view to FIGURE 8 showing a dual roller.

In FIGURE 1 the road engaging rollers 5 and 6 are shown mounted in forks at the ends of plungers 2 and 3 respectively which are reciprocable in ram cylinders 72, 73 fixed to the back axle 1. The rams are restrained against rotation in their cylinders so that the axes of rotation of the rollers are disposed in the required angular relationship to provide the desired sideways movement of the car. For example as viewed in FIGURE 3 their axes converge so that they intersect one another at a point opposite an extension of the front axle and a line bisecting the angle between them, intersects a mid point on the rear axle and subtends an angle of about 25° to the fore and aft axis of the car. The plungers are shown in the extended position so the vehicle wheels 8 are raised from the ground. As will be seen from FIGURE 2 the axle 1 is mounted on the usual springs 7. The ram cylinders are connected at their upper ends by pipes 9 to the cross piece of a T connection 10 fixed to the back axle and the branch of the T is connected to a flexible hose 11 which in its turn is connected to a pipe 12 fixed to a part of the chassis (not shown). Compression springs are provided between the lower ends of the ram cylinders and the underside of enlarged heads on the plungers within the cylinders none of which parts is shown. The pipe 12 is connected to a port in a valve casing which has two other ports which are connected respectively by pipes 16 and 18 to outlet of a pump 15 and to a fluid reservoir 17. The inlet of the pump is connected by a pipe 19 also to the reservoir. As will be seen the rotatable element of the valve is provided with a T-shaped passage which in one position connects the outlet from the pump to the pipe 12 and hydraulic ram cylinders and in another position connects the outlet of the pump to the reservoir 17.

The assemblage of pump, reservoir and valve mechanism may be mounted on a suitable part of the vehicle so that the control member for the valve is readily accessible to the driver.

The pump 15 is driven by the vehicle engine through a suitable transmission 13. In FIGURE 3 the vehicle 22 is shown in a position in which it has been driven slantwise into a gap between two vehicles 20, 21. The rollers are lowered whereafter the vehicle is again driven forwardly resulting in the rear of the vehicle being slewed in the directions of the arrows until it finally assumes the position shown by the chain line.

Extension rods 74 may be formed on the ram plungers which rods may extend through glands in the tops of the ram cylinders 72 and 73 and the upper ends of the rods may be provided with lever arms 75 which are cross-connected by a cross bar 76 and one of the extension rods may be rotated between two limiting positions by a transmission 77 similar to a steering transmission from the drivers seat so that the rollers may be set in positions for either swinging the end of the vehicle right or left.

In FIGURE 4 the rollers 5 and 6 are shown mounted at the end of the arms 23, 24 the other ends of which are pivoted at 25 to fittings 26 fixed to the rear axle 1. The ends of the arms 23, 24 are connected to the plungers 2 and 3 of the rams 28, the cylinders of which are pivoted at 27 also to the back axle.

The arrangement shown in FIGURE 5 is very similar to that of FIGURE 4 the arms 23, 24 being pivoted higher up on the axle 1 at 25 and the ram plunger 2 being pivoted to the arms 23 further from its end.

FIGURE 6 shows an articulated or semi-trailer type of lorry or truck comprising a tractor unit 31, and a trailer unit 32, joined by a pivot 33, located over the back axle, 34 of the tractor unit. The trailer unit 32, is supported at the rear by a conventional load-carrying axle, 35 whose wheels are neither driven nor steerable.

The truck is shown in the attitude it will take up before putting the parking equipment into operation. The driver, approaching from the right of FIGURE 6, as drawn, has seen a space into which his vehicle will just fit. He has driven the tractor end close to the curb, and drawn it forward to within about a yard of the front obstruction 36, say the rear of another lorry. The drawing of the tractor unit 31 in full line, shows the driver in the course of straightening up after bringing the tractor unit to a position more or less parallel with the curb 37. He has ample space to do this as the parking space considered in relation to the tractor unit alone is quite long.

He is now left with the trailer unit angled sharply out from the curb and with its rear corner only just clearing the right-hand or rear obstruction 38, say the front of a third truck.

The driver now halts his lorry in this position and operates the control knob 39 of the parking equipment. The engine of the tractor unit 31 is equipped with a fluid pump, not shown, which normally circulates fluid through a control valve and thence to a filter and reservoir from which it is again fed to the pump. On the control knob 39 being pulled, this idle circulation of oil is diverted into a pipe line, not shown, which carries it to the rear axle 35 of the trailer unit 32, where it enters rams 40 and 41 and causes parking rollers 42 and 43 to descend towards the ground, lifting the rear road wheels 44 and 45 slightly off the road, and assuming the position shown in more detail in FIGURE 7.

The parking rollers 42 and 43 may be carried on arms which are pivoted in bearings attached to the axle. The axes of these parking wheels are set at an angle to the fore and aft axis of the trailer portion 32, and they are preferably also at an angle to one another which will vary according to their distance from one another. For example, if the parking device were to have only a single parking roller, or a pair of co-axial parking rollers, mounted at the centre 46 of rear axle 35 (as shown in FIG. 10), it might be mounted at an angle of 25°, and this axis would intersect the normal to the fore and aft axis of the trailer unit, which passes through the pivot 33, at the point 47. Point 47 may be referred to as the centre of rotation of the parking unit, and the angle between the fore and aft axis of the trailer unit (or of the car in the case of a front-wheel drive car) and the line joining axle centre 46 at the point of rotation 47 may be called the mean angle of the parking rollers.

In order to support the load safely, and prevent an excessive over-turning moment being applied to the pivot 33 (or to the front axle of a front-wheel drive car), particularly on a cambered road, it will normally be preferable to use two rollers, or two pairs of co-axial rollers, spaced as widely as possible along the axle 56, but wtihout their coming into contact with wheels 57. These rollers should preferably be mounted with their axes also intersecting at the point 47, so that one forms a greater angle than the mean angle with the fore and aft axis of the trailer portion 32, and the other forms a lesser angle.

In FIGURE 6, as shown, the off-side parking roller 42 is mounted at an angle of 20° to the trailer axis, and the near-side parking roller 43 is mounted at an angle of 30°. These angles have been found to give good results on a working model of the invention.

The parking rollers need not necessarily be associated with the rear axle, nor need they be between the rear wheels so long as, when they are actuated, the rear wheels are caused to rise slightly from the road.

In FIGURE 6, when the parking rollers have caused the rear wheels 44 and 45 to leave the road, the driver again drives the tractor unit forward until it closely approaches the obstruction 36 in front. The centre line 46 of the trailer rear axle will then follow a path prescribed by the line 48, and the trailer unit will take up positions succesively shown in outline at 49 and 50.

The intermediate positions of the trailer outline, the near side rear wheel 45, and the near side parking roller 43, are shown in coarse-pitch chain-line, and the final parked position of these items is shown in fine-pitch chain-line.

The pivot 33 is similarly shown in an intermediate position 51, and in its final parked position 52, and the intermediate and final positions of the front outline of the tractor unit are similarly shown at 53 and 54.

The path of the rear corner of the trailer unit as it passes the rear obstruction 38 in the series of radii 55. The line 48 in FIGURE 6 is an actual plotting of the path of the centre point of the rear axle of a working model according to this invention, made to the same scale as FIGURE 6, and operated by moving the tractor unit forward and causing its trailer unit to park when superimposed on this drawing.

To enable the parking rollers 42 and 43 to reach their operating position without disturbing the vehicle or causing unnecessary friction, the axis of the bearings in which their supporting arms are carried should be parallel to the axes of the parking rollers, that is to say, they should be mounted at a similar angle to the rear axle.

Similarly, the device may be used to extricate the vehicle from a constricted position by driving forward to the limit of the available clearance, operating the parking device, and then reversing the tractor portion, when the rear trailer portion will move sharply out from the curb along the line 48. The device may also be used to enable a vehicle to negotiate sharp turns in narrow roadways or warehouse entrances under conditions otherwise impossible, or possible only with lengthy manoeuvring.

FIGURES 7 and 8 show one embodiment of this construction. FIGURE 7 is a view in elevation of a rear axle 56 and wheel 57, and FIGURE 8 is a plan view of the same assembly. A housing 58 carries bearings 59 in which is mounted arm 60. Roller 61 is mounted on the end of arm 60, and an intermediate pivot 62 connects with the extensible portion 63 of a ram 64. The upper end of ram 64 is carried by a bracket 65 to which it may be connected by a pivotable mounting. Oil or similar hydraulic fluid is supplied to ram 64 by flexible hose 66. When oil under pressure is directed into ram 64, the arm and parking roller are pushed downwards from their retracted position, shown in chain-line, until the parking roller 61 touches the road. Further movement causes the wheel 57 to rise until it is clear of the road, and the assembly reaches the position shown in full line in FIGURE 7.

A barrel-type retraction spring 67 may be mounted on an extension pivot 68 of arm 60. Initial tension may be applied to this barrel spring on assembly, so as to maintain the equipment in the retracted position when not in use. On pressure being applied in the ram 64 and the equipment being brought into operation, rotation of pivot 68 will cause additional deflection of spring 67, and on the hydraulic pressure being relaxed by pushing in control knob 39 at the end of the parking operation, the arm and roller will be returned to their retracted position by torque exerted by spring 67.

The retractive effort may be applied by any other known type of spring arranged in any convenient manner, or the equipment may be retracted by hydraulic means employing a double-acting ram. Retraction by spring means will normally be preferable as it facilitates the use of the simple and foolproof control system such as is described in United States patent application No. 801,254.

FIGURE 9 shows an alternative arrangement of this parking equipment, employing a pair of co-axial parking rollers 70 in each unit.

I claim:

1. An apparatus for parking an articulated vehicle having a trailer portion pivoted at its front end to a tractor portion to swing about a pivot axis lying in a vertical plane and intersecting a central fore and aft line of the vehicle, said trailer portion having trailer wheels disposed on a back axle on which axle are mounted on opposite sides of the central fore and aft line retractible and extendible carriers, road engaging rollers mounted on said carriers which rollers when in contact with the ground rotate about fixed axes which are substantially parallel with the ground and which converge to a point outside the track of the trailer wheels and lying on a line at right angles to the aforesaid fore and aft line and intersecting said pivot axis of the two parts of the vehicle.

2. An apparatus for parking an articulated vehicle according to claim 1 wherein said point of convergence of said axes of rotation and said line at right angles to the fore and aft axis of the vehicle and intersecting said vertical pivot axis appear as viewed in plan.

References Cited in the file of this patent

UNITED STATES PATENTS

| | | |
|---|---|---|
| 1,758,964 | Myers | May 20, 1930 |
| 2,002,724 | Walker | May 28, 1935 |
| 2,358,592 | Quinn | Sept. 19, 1944 |
| 2,746,554 | Matthews | May 22, 1956 |
| 2,872,991 | Collins | Feb. 10, 1959 |

FOREIGN PATENTS

| | | |
|---|---|---|
| 857,301 | France | Apr. 15, 1940 |
| 1,136,229 | France | Dec. 22, 1956 |